United States Patent [19]

Kreilein et al.

[11] Patent Number: 6,046,286

[45] Date of Patent: Apr. 4, 2000

[54] PROCESS FOR THE FREE RADICAL POLYMERIZATION OF ETHYLENICALLY UNSATURATED MONOMERS IN AN AQUEOUS MEDIUM

[75] Inventors: Kurt Kreilein; Dirk Andrejewski, both of Burghausen, Germany; Helmut Hammer, Ranshofen, Austria; Hellmut Jetzlsperger, Haiming, Germany

[73] Assignee: Vinnoiit Kunststoff GmbH, Ismaning, Germany

[21] Appl. No.: 08/765,984

[22] PCT Filed: Dec. 7, 1995

[86] PCT No.: PCT/EP95/04830

§ 371 Date: Jan. 3, 1997

§ 102(e) Date: Jan. 3, 1997

[87] PCT Pub. No.: WO96/17875

PCT Pub. Date: Jun. 13, 1996

[30] Foreign Application Priority Data

Dec. 8, 1994 [DE] Germany .................... 44 43 752

[51] Int. Cl.$^7$ ........................................ C08F 2/16
[52] U.S. Cl. ................... 526/88; 526/81; 526/86
[58] Field of Search ................... 526/88, 81, 86, 526/80, 329.4, 344.2

[56] References Cited

U.S. PATENT DOCUMENTS

| | | |
|---|---|---|
| 2,880,076 | 3/1959 | Kischner . |
| 3,033,839 | 5/1962 | Heckmaier ................ 526/344.2 |
| 3,324,097 | 6/1967 | Pears . |
| 3,332,918 | 7/1967 | Benatta ................ 526/344.2 |
| 3,546,154 | 12/1970 | Hwa ................ 526/81 |
| 3,551,399 | 12/1970 | Yonezu . |
| 3,974,133 | 8/1976 | Evans ................ 526/207 |
| 4,348,496 | 9/1982 | Puhe ................ 524/127 |
| 4,528,337 | 7/1985 | Kreilein ................ 526/70 |
| 4,661,569 | 4/1987 | Heeine ................ 526/62 |
| 4,727,091 | 2/1988 | Haweylko ................ 526/86 |
| 5,187,233 | 2/1993 | Ball . |

FOREIGN PATENT DOCUMENTS

| | | |
|---|---|---|
| 0078043 | 5/1983 | European Pat. Off. . |
| 0035785 | 3/1984 | European Pat. Off. . |
| 0093936 | 1/1986 | European Pat. Off. . |
| 0343919 | 11/1989 | European Pat. Off. . |
| 1557928 | 12/1979 | United Kingdom . |

OTHER PUBLICATIONS

Translation P 31424201 of Oct. 26, 1981 Wa 8105–V.

*Primary Examiner*—Christopher Henderson
*Attorney, Agent, or Firm*—Coiiard & Roe, P.C.

[57] ABSTRACT

A process for the radical polymerization of ethylenically unsaturated monomers in an aqueous medium has (a) the starting solution used for the polymerization and the educts required for polymerization such as monomers, germ latex, buffering agents, emulsifiers and/or protective colloids are introduced into a pre-mixing device and thoroughly mixed, heated before being transferred to the polymerization vessel to the polymerization temperature, no initiator being used if a thermal radical initiator is used and only individual initiator components being used where a redox initiator system is used; (b) once the mixture has reached polymerization temperature, it is transferred to a polymerization vessel, the wall of which during the transfer and polymerization is maintained by cooling at a temperature below the polymerization temperature; polymerization is started by adding the thermal initiator or additional initiator components of the redox initiator system, the other educts being added at the start of and/or during polymerization; and (c) once the polymerization is finished and the pressure differential between the polymerization vessel and degassing vessel has been reduced to 3 bar or less, the polymer dispersion is let out into a degassing vessel and degassed by applying heat and/or a vacuum.

10 Claims, 1 Drawing Sheet

PROCESS FOR THE FREE RADICAL POLYMERIZATION OF ETHYLENICALLY UNSATURATED MONOMERS IN AN AQUEOUS MEDIUM

BACKGROUND OF THE INVENTION

1. Field of the Invention

The invention relates to a process for the free radical polymerization of ethylenically unsaturated monomers in an aqueous medium and to a device for carrying out the process.

2. The Prior Art

Processes for the polymerization of ethylenically unsaturated monomers in an aqueous medium, such as, for example, emulsion, suspension or microsuspension polymerization, are described in detail in the literature and are known to experts, for example, from the following publications: Houben-Weyl, Methoden der organischen Chemie [Methods of Organic Chemistry], 4th Edition, Volume XIV, Stuttgart (1961); Houben-Weyl, Methoden der organischen Chemie [Methods of Organic Chemistry], Volume E 20, Stuttgart (1987); EP-B 35785, EP-B 78043 and EP-B 93936.

Free radical polymerization of ethylenically unsaturated monomers in an aqueous medium is as a rule carried out in polymerization containers, for example autoclaves, with stirring. For this reaction, the mixing water, the monomer fraction, buffer salts, emulsifiers, protective colloids and, if appropriate, seed latices, together with the initiator or, in the case of redox initiators, together with the initiator components, are initially introduced, in their entirety or in part, into the autoclave, mixed thoroughly and, if appropriate, heated up to the polymerization temperature, and the monomers are polymerized completely, with stirring and removal of the heat of polymerization. In this procedure, the individual components of the polymerization batch, such as, for example, monomers, emulsifiers and/or initiators, can also be metered in subsequently. At the end of the polymerization, the unreacted monomers are removed, with utilization of the heat of polymerization or external introduction of energy, or the contents of the autoclave are drained into a downstream container, where the residual monomers are removed from the resulting polymer latex or the polymer suspension.

The wall deposits which form during the polymerization are a great problem in the free radical polymerization of ethylenically unsaturated monomers. They impede removal of heat from the reaction container and must be removed from the internal wall of the container by expensive cleaning processes after each batch.

High pressure water which is sprayed onto the container wall under, for example, 200 bar by rotating jets is generally used for cleaning the container wall. For this purpose, either the containers are opened and the corresponding cleaning equipment is inserted through a container opening, for example the open manhole, or cleaning equipment permanently installed on the container is used. Waste products and polluted waste water are obtained by this procedure, and must be removed; furthermore, these cleaning operations are time-consuming. Such a procedure is mentioned, for example, in GB-A 1557928.

To prevent wall deposits during free radical polymerization of ethylenically unsaturated monomers in the aqueous phase, a large number of wall coating compositions which are applied to the autoclave wall before the polymerization and are said to prevent the formation of wall deposits due to their inhibiting action have therefore been proposed. Coating the autoclave wall is described, for example, in U.S. Pat. No. 4,661,569. The disadvantages of such wall coating compositions are their cost, the time and apparatus needed for application, and their limited effectiveness during emulsion polymerization, since the emulsifier systems employed in this process accelerate detachment of the coating from the container wall.

SUMMARY OF THE INVENTION

An urgent object was therefore to improve the prior processes and devices for free radical poly-merization of ethylenically unsaturated monomers in an aqueous medium such that the formation of wall deposits on the autoclave wall is prevented, and as a result several polymerization batches can be processed in succession, without high pressure cleaning, without the need for a wall coating and without opening the containers.

The invention relates to a process for the free radical polymerization of ethylenically unsaturated monomers in an aqueous medium, which comprises a) initially introducing the mixing water employed for the polymerization and the starting materials required for the polymerization, such as monomers, seed latex, buffer substances, emulsifiers and/or protective colloids, in their entirety or in part, into a premixing apparatus and mixing them thoroughly, and, before transfer into the polymerization container, heating them up to the polymerization temperature, no initiator being initially introduced if a thermal free radical initiator is used and only individual initiator components being initially introduced if a redox initiator system is used, b) transferring the mixture, which has been heated up to the polymerization temperature, into a polymerization container, the wall of which is kept at a temperature below the polymerization temperature, by cooling, on feeding in the mixture and during the polymerization, starting the polymerization by metering in the thermal initiator or the other initiator components of the redox initiator system, if appropriate the remaining starting materials being metered in at the start and/or during the polymerization, and c) after the end of the polymerization and after pressure compensation to a differential pressure of $p \leq 3$ bar between the polymerization container and degassing container, draining the polymer dispersion into a degassing container and degassing it by heating up and/or applying a vacuum.

The invention furthermore relates to a device for carrying out the process, which essentially comprises a premixing apparatus (1), a polymerization container (7) which is coupled to this via line (5) and is connected to the degassing container (11) via line (10), the premixing apparatus (1) essentially being equipped with feed lines (3) for introduction of material and with a heating device and, if appropriate, a mixing device, the polymerization container (7) essentially being equipped with feed lines (9) for introduction of material and with a heating/cooling device and a stirrer (8), and the degassing container (11) essentially being equipped with a heating/cooling device, a stirrer (12) and a vacuum line (13).

A preferred embodiment of the device according to the invention is shown in FIG. 1: the premixing apparatus (1) is preferably a cylindrical stirred container with a plurality of feed lines for introduction of material. For admixing solid polymerization auxiliaries, if appropriate, a solids sluice (4), through which the mixing water or portions of the mixing water can also be flushed, can be included upstream of the premixing apparatus. For heating, the premixing apparatus (1) is preferably provided with a double-walled jacket, which is optionally connected to a water circuit charged with water or steam. Conventional stirrers, for example a blade stirrer, can be used as the mixing device. For emptying the premixing apparatus (1) via discharge line (5), it can be equipped, if appropriate, with a pump (6). If the device is designed such that the premixing apparatus (1) is located above the polymerization container (7), the pump (6) can be dispensed with.

The polymerization container (7) is preferably a cylindrical stirred container with a centrally incorporated stirrer (8). For heating or cooling, the polymerization container (7) is preferably provided with a double-walled jacket charged with heating water or cooling water. In a preferred embodiment, the container is equipped with a condenser mounted on top, with rinsing devices and with spraying devices for spraying in wetting agents. The drain line (10) of the polymerization container (7) preferably has a gradient such that the entire contents of the container can drain into the degassing container (11).

The degassing container (11) is as a rule a cylindrical container with a centrally located stirrer (12). The container can furthermore be provided with a rinsing device operated in a closed system. The degassing container (11) can be degassed via vacuum pumps (14) and emptied via a pump (16). In a preferred embodiment, the upper and lower part of the container are each equipped with separate heating/cooling systems, for example two double-walled jackets.

In the process according to the invention, a procedure is preferably followed in which the initial introduction, thorough mixing and heating of the starting materials required for the polymerization are carried out in a stirred container. However, a procedure can also be followed such that the initial introduction and thorough mixing are carried out in the initial mixture container, and heating to the polymerization temperature is carried out by blowing steam into the drain line to the polymerization container, or heating to the polymerization temperature is carried out in the drain line by means of a heat exchanger.

In another preferred embodiment, the premixing can be carried out such that the mixing water and starting materials or mixtures thereof, are metered into a mixing zone and are heated up by blowing in steam or by heat transfer by means of a heat exchanger. The feed line to the polymer-ization vessel, for example, can serve here as the mixing zone, that is to say as the premixing apparatus (1). In all the embodiments mentioned, the mixture introduced is preferably heated up to a temperature of 30 to 90° C.

In general, the mixing water and at least a portion of the monomers are initially introduced. The other starting materials required for the polymerization can be initially introduced in their entirety or in part or metered in only during the polymerization. In a preferred embodiment, the mixing water, buffer salts and, if appropriate, seed latices are initially introduced in their entirety, while the monomers, emulsifiers and/or protective colloids are initially introduced in part and the remainder is metered in during the polymerization. The monomers, emulsifiers and/or protective colloids can in this case be metered in together, as an aqueous preemulsion, or separately.

If a redox initiator system is used, one of the components, the oxidation component (agent which forms free radicals) or the reducing agent, is initially introduced and the other components are metered in only after the batch has been transferred into the polymerization container. Preferably, the reducing agent is initially introduced and the agent which forms free radicals is metered into the polymerization container. In the case of thermal initiation of the polymerization, the initial mixture is mixed and heated up without the initiator and the free radical initiator is metered into the polymerization container.

After transfer of the mixture, which has been preheated to the polymerization temperature, into the polymerization container, the polymerization is started by metering in the free radical initiator and, if a redox catalyst system is used, by metering in the other catalyst component. It is essential here that the container wall of the polymerization container is cooled to a temperature as far as possible below the particular polymerization temperature on transfer of the preheated mixture, but at the latest at the time of metering in of the free radical initiator, and throughout the duration of the polymerization. The wall temperature of the polymerization container is preferably at least 5 to 20° C. below the polymerization temperature.

When the polymerization has ended, the product is transferred to a degassing container for removal of residual monomers, pressure compensation between the polymerization container and degassing container being carried out beforehand. The pressure compensation is carried out here such that the differential pressure p is not more than 3 bar; preferably, the differential pressure p is $\leq 1$ bar. After the transfer, the polymerization container can be filled with another batch for polymerization. A degassing container which is equipped with two separate heating/cooling circulations, which are operated such that the upper part, preferably approximately the upper half, of the container has a lower temperature than the lower part, preferably approximately the lower half, is preferably used. In the preferred embodiment, the polymer dispersion is introduced into the evacuated degassing container at approximately half the height and is degassed to the desired residual monomer content under a vacuum, it being possible for the residual monomer to be recovered, if appropriate, via a downstream column.

After the degassing, the polymer dispersion is pumped off. The polymer can be obtained from the polymer dispersion by means of methods known to the expert, for example by coagulation and/or drying.

The process according to the invention is suitable for the polymerization of ethylenically unsaturated monomers by the emulsion, suspension or microsuspension process in an aqueous medium. The emulsion polymerization process is preferred.

Suitable ethylenically unsaturated monomers are, for example, vinyl halides, such as vinyl chloride or vinylidene chloride; vinyl esters of unbranched or branched alkylcarboxylic acids having 1 to 15 C atoms; esters of acrylic acid or methacrylic acid with unbranched or branched alcohols having 1 to 12 C atoms; olefins or dienes, such as ethylene, propylene, butadiene and isoprene; and vinylaromatics, such as styrene, methylstyrene and vinyltoluene.

The process according to the invention is particularly suitable and therefore preferred for homo-, co- and grafting copolymerization of vinyl chloride in an aqueous medium, in particular by the emulsion polymerization process.

Suitable comonomers are, for example, vinyl esters, such as vinyl acetate, (meth)acrylic acid esters, such as methyl methacrylate, methyl acrylate and n-butyl acrylate, vinylaromatics, such as styrene, olefins, such as ethylene, ethylenically unsaturated mono- and dicarboxylic acids, such as acrylic acid, methacrylic acid, maleic acid and fumaric acid, and mono- and diesters thereof, acrylamide, vinylsulfonate and 2-acrylamido-2-methylpropanesulfonate, the water-soluble strongly polar monomers usually being employed in small amounts to stabilize the dispersion.

The abovementioned publications are referred to in respect of the reaction conditions, initiator systems and further additives, such as emulsifiers, protective colloids and buffers, customary for polymerization of ethylenically unsaturated compounds in an aqueous medium.

The emulsion polymerization mentioned as preferred is usually carried out at a temperature of 30 to 90° C.

For initiation of the emulsion polymerization, the customary water-soluble agents which form free radicals are employed in an amount of preferably 0.001 to 0.3% by weight, based on the monomer phase. Examples of agents which form free radicals are ammonium and potassium peroxodisulfate; hydrogen peroxide; alkyl hydroperoxides, such as t-butyl hydroperoxide; and potassium, sodium and ammonium peroxodiphosphate. The initiation can be carried out either by use of the peroxo compounds mentioned alone, or, at lower temperatures, by using a combination of the peroxo compounds mentioned with reducing agents. Suitable reducing agents are, for example, sodium formaldehyde-sulfoxylate, sodium sulfite, sodium hydrogen sulfite, dithionite or ascorbic acid, which can be employed in an amount of preferably 0.01 to 0.5% by weight, based on the monomer phase.

Dispersing agents which can be used are the ionic and nonionic emulsifiers customary in emulsion polymerization. Preferably, 0.1 to 10.0% by weight of emulsifier, based on the monomer phase, is employed. Suitable emulsifiers are, for example, anionic surfactants, such as alkyl sulfates having a chain length of 8 to 18 C atoms, alkyl and alkylaryl ether-sulfates having 8 to 18 C atoms, alkyl and alkylaryl ether-sulfates having 8 to 18 C atoms in the hydrophobic radical and up to 40 ethylene oxide or propylene oxide units, alkyl- or alkylarylsulfonates having 8 to 18 C atoms, oleic acid sulfonates, esters and half-esters of sulfosuccinic acid with monohydric alcohols or alkylphenols. Suitable nonionic surfactants are, for example, alkyl polyglycol ethers or alkylaryl polyglycol ethers having 8 to 40 ethylene oxide units.

If appropriate, buffer substances, such as sodium carbonate, sodium hydrogen phosphate or alkali metal acetates, can also be employed for the polymerization.

The polymerization is carried out discontinuously, with or without the use of seed latices, with initial introduction of all or individual constituents of the reaction mixture or with initial introduction in part and subsequent metering in of the constituents or individual constituents of the reaction mixture.

Compared with the procedures known from the prior art, in which heating up of the polymerization batch is carried out in the presence of the initiator and usually, as is the removal of residual monomers, in the polymerization container, the following advantages have surprisingly resulted with the procedure according to the invention:

The formation of troublesome wall deposits is largely prevented in the initial introduction, polymerization and degassing containers with the process according to the invention. This has the result that, with the process according to the invention in contrast to the procedures practiced to date, in which the poly-merization container must be opened for cleaning after each batch, more than 10 batches can be processed in succession in a closed procedure without cleaning the containers. The emissions which arise on opening the container, for example in the case of vinyl chloride polymerization, are thus avoided. The need for expensive cleaning steps between the individual batches or the application of wall coatings, with the associated disadvantages, is furthermore eliminated.

DETAILED DESCRIPTION OF PREFERRED EMBODIMENTS

The following examples serve to further explain the invention and have no limiting character.

EXAMPLE 1

Figure 1:
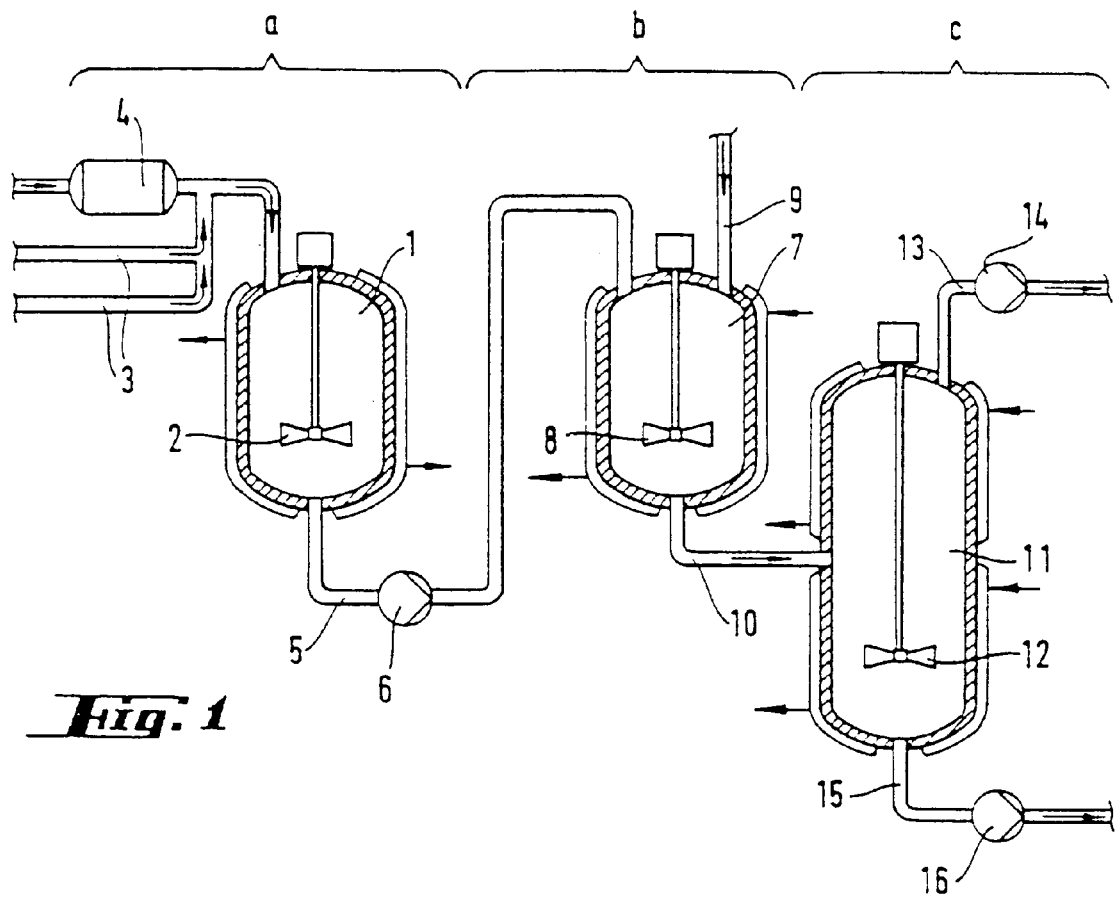
FIG. 1 shows an apparatus for carrying out a process according to the present invention.

The process according to the invention was carried out in the device according to FIG. 1.

5 kg of buffer salts (3 kg of ammonium bicarbonate, 2 kg of sodium bisulfite and traces of Cu and Fe salts) were flushed with 2000 kg of water via a solids sluice (4) into an evacuated stirred container (1) (25 m$^3$ autoclave) with a blade stirrer (2) and metering devices (3), and a further 6000 kg of water, 150 kg of an aqueous solution of ammonium laurate (15% by weight emulsifier content) and 4000 kg of vinyl chloride were initially introduced therein. The initial mixture was heated up to 55° C., with stirring, and pumped via line (5) by means of a pump (6) over into the evacuated polymerization container (7) (25 m$^3$ autoclave) with a blade stirrer (8) and metering devices (9), and 1000 kg of water were subsequently flushed in. The jacket temperature of the polymerization container (7) was 50° C.

6500 kg of vinyl chloride, a further 800 kg of the emulsifier solution and 200 kg of aqueous potassium peroxodisulfate solution (1.0% strength) were metered into the polymerization container (7) via the metering device (9) in the course of 6 hours, the jacket temperature having been lowered to 30° C. before the start of metering of the initiator. After 6 hours, the polymerization was interrupted and the polymer emulsion was drained off via line (10) into the evacuated degassing container (11) (40 m$^3$), an almost complete pressure compensation (p<3 bar) between the polymerization container and degassing container having been carried out beforehand. The degassing container (11) was equipped with a stirrer (12) and was evacuated via line (13) and the vacuum pump (14). The feed line (10) entered at approximately half the height of the degassing container (11). Subsequent flushing with 500 kg of water was then carried out.

The PVC latex was degassed in the degassing container (11) for 2 hours at 80° C., with stirring, the top half of the container being equipped with a heating/cooling circulation which was separate from the bottom half and was operated about 5° C. lower in the top half than in the bottom half. Thereafter, the batch was cooled to about 60° C. and pumped off with a vacuum applied via line (15) by means of the pump (16), and subsequent flushing with 500 kg of water was carried out.

The entire operation was repeated ten times, with the difference that in the subsequent batches a vinyl chloride atmosphere prevailed in the various containers at the start of each step. After the 10th batch, the vinyl chloride atmosphere was removed from the containers by applying a vacuum and the containers were opened.

The initial mixture container (1) had no wall deposit and did not have to be cleaned. The wall of the polymerization container (7) had a white deposit which had a wet weight of 5 kg after high pressure cleaning with water. The degassing container (11) was cleaned with incorporated high pressure cleaning equipment; the deposit weighed 40 kg wet.

COMPARISON EXAMPLE A

Figure 2:
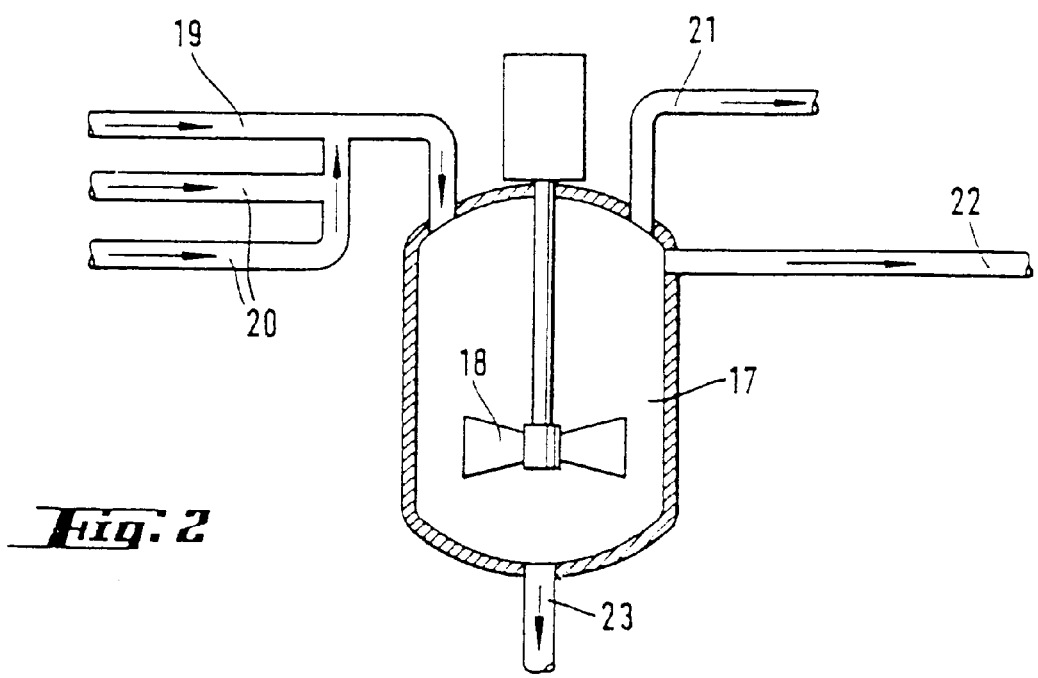
FIG. 2 shows an apparatus for carrying out a comparison process according to the prior art.

For comparison, a polymerization such as corresponds to the prior art was carried out in the device according to FIG. 2.

5 kg of buffer salts (3 kg of ammonium bicarbonate, 2 kg of sodium bisulfite and traces of Cu and Fe salts) were initially introduced into a 25 m$^3$ autoclave (17) with a blade stirrer (18) and metering devices (19, 20, 21) via the manhole, this was closed and the container was evacuated and filled via (19) with 10,000 kg of completely desalinated water, via (20) with 150 kg of an aqueous solution of ammonium laurate (15% by weight emulsifier content) and via (20) with 4000 kg of vinyl chloride. The polymerization batch was heated up to 54° C. and 6000 kg of vinyl chloride, a further 800 l of emulsifier solution and 200 kg of potassium peroxodisulfate solution (1.0% strength) were metered in via (21) in the course of 6 hours. Thereafter, the residual monomer was removed via line (22), the PVC latex formed being heated at 80° C. in the autoclave (17) for 2 hours. The batch was then cooled and drained off via line (23).

After the batch had been drained off, the autoclave wall was covered with a solid white crust, which was removed with high pressure water of 200 bar. The wall deposit rinsed off had a wet weight of about 50 kg.

We claim:

1. A process for the free radical polymerization of ethylenically unsaturated monomers in an aqueous medium, which comprises:
    a) initially introducing mixing water employed for the polymerization and starting materials required for the polymerization, into a premixing apparatus and mixing them thoroughly to form a mixture, and
        before transferring the mixture into a olymerization container, heating the mixture up to a polymerization temperature, no thermal free radical initiator being initially introduced;
    b) transferring the mixture, which has been heated up to the polymerization temperature, into the polymerization container, the wall of which is kept at a temperature below the polymerization temperature, by cooling; feeding in the mixture and starting the polymerization by metering in the thermal free radical initiator, and during the polymerization metering in the thermal initiator; and
    c) after an end of the polymerization and after pressure compensation to a differential pressure of p≦3 bar between the polymerization container and a degassing container, draining the polymer dispersion into the degassing container and degassing the dispersion by heating up or applying a vacuum.

2. The process as claimed in claim 1, wherein the process is employed for homo-, co- and grafting copolymerization of vinyl chloride.

3. The process as claimed in claim 2, wherein the polymerization is carried out by the emulsion polymerization process.

4. The process as claimed in claim 1,
    wherein the process is for homopolymerization of vinyl chloride; and
    wherein the process is by emulsion polymerization.

5. A process as claimed in claim 1,
    wherein initial introduction, thorough mixing and heating in step a) are carried out by metering the mixing water and starting materials or mixtures thereof, into a feedline to the polymerization vessel, and are heated up by blowing in steam or by heat transfer by means of a heat exchanger.

6. A process as claimed in claim 2,
    wherein initial introduction, thorough mixing and heating in step a) are carried out by metering the mixing water and starting materials or mixtures thereof, into a feedline to the polymerization vessel, and are heated up by blowing in steam or by heat transfer by means of a heat exchanger.

7. A process as claimed in claim 3,
    wherein initial introduction, thorough mixing and heating in step a) are carried out by metering the mixing water and starting materials or mixtures thereof, into a feedline to the polymerization vessel, and are heated up by blowing in steam or by heat transfer by means of a heat exchanger.

8. A process for the free radical polymerization of ethylenically unsaturated monomers in an aqueous medium, which comprises:
    a) initially introducing mixing water employed for the polymerization and the starting materials required for the polymerization, into a premixing apparatus and mixing them thoroughly, to form a mixture, and before transferring the mixture into a polymerization container, heating the mixture up to a polymerization temperature, and only individual initiator components being initially introduced as a redox initiator system;
    b) transferring the mixture, which has been heated up to the polymerization temperature, into the polymerization container, the wall of which is kept at a temperature below the polymerization temperature, by cooling, feeding in the mixture and starting the polymerization by metering in other initiator components of the redox initiator system, and during the polymerization, metering in other initiator components of the redox initiator system; and
    c) after an end of the polymerization and after pressure compensation to a differential pressure of p≦3 bar between the polymerization container and a degassing container, draining the polymer dispersion into the degassing container and degassing the dispersion by heating up or applying a vacuum.

9. The process according to claim 1, further comprising metering in remaining starting materials at a time selected from the group consisting of at the starting of the polymerization, during the polymerization, and at the starting and during the polymerization.

10. The process according to claim 8, further comprising metering in remaining starting materials at a time selected from the group consisting of at the starting of the polymerization, during the polymerization, and at the starting and during the polymerization.

* * * * *

UNITED STATES PATENT AND TRADEMARK OFFICE
CERTIFICATE OF CORRECTION

PATENT NO. : 6,046,286
DATED : April 4, 2000
INVENTOR(S) : Kreilein, et. al.

It is certified that error appears in the above-identified patent and that said Letters Patent is hereby corrected as shown below:

Title page, item [73] Assignee: change the of the assignee to read-- Vinnolit Kunststoff GmbH--.

Signed and Sealed this

Sixth Day of February, 2001

Attest:

Q. TODD DICKINSON

*Attesting Officer*        *Director of Patents and Trademarks*